United States Patent

[11] 3,538,894

| [72] | Inventor | Jury Alexandrovich Kogan<br>Moscow, U.S.S.R. |
| --- | --- | --- |
| [21] | Appl. No. | 744,012 |
| [22] | Filed | July 11, 1968 |
| [45] | Patented | Nov. 10, 1970 |
| [73] | Assignee | Tsentralny Ordena Trudovogo Krasnogo<br>Znameni Nauchno<br>Issledovatelsky avtomobilny i avtomotorny<br>Institut, Moscow, U.S.S.R. |

[54] SELF-ADJUSTING VALVE DRIVE FOR INTERNAL COMBUSTION ENGINES
2 Claims, 3 Drawing Figs.

[52] U.S. Cl. .................................................. 123/90
[51] Int. Cl. ..................................................... F01 1/18,
F01 1/22
[50] Field of Search............................................ 123/90,
90(B), 90(B2), 90(B3), 90(B4), 90(B5), 90(H1), 90(H),
90(H3), 90(PR)

[56] References Cited
UNITED STATES PATENTS

| 1,907,631 | 5/1933 | Warren | 123/90(B3)UX |
| 2,322,514 | 6/1943 | Goodwin | 123/90(H3)UX |
| 2,411,650 | 11/1946 | Burkhardt | 123/90(H3)UX |
| 2,418,110 | 4/1947 | Burkhardt | 123/90(B4)UX |

*Primary Examiner*—Al Lawrence Smith
*Attorney*—Waters, Roditi, Schwartz & Nissen

ABSTRACT: A valve drive of an internal combustion engine includes an adjusting screw screwed into a threaded opening of a valve rocking arm and loaded with a torsional spiral spring. The adjusting screw has a nonthrust thread, *i.e.*, a thread whose lead angle is greater than the angle of friction and the adjusting screw is provided with a limiter of the angle of its turn, the limiter being essentially a U-shaped member spanning the threaded end of the valve rocking arm. When a cam on the cam shaft displaces a pusher, the adjusting screw turns under the effect of load overcoming the force of the preloaded spring and takes along the limiter. Having turned through a small angle, the limiter stops. Simultaneously, the adjusting screw, which is frictionally connected with the limiter, also stops. Upon seating of the valve, the spring unwinds and drives the adjusting screw back to the stop, and the limiter is turned to its initial position.

SELF-ADJUSTING VALVE DRIVE FOR INTERNAL COMBUSTION ENGINES

This invention relates to internal combustion engines, and more specifically to self-adjusting drives of the valves of internal combustion engines.

Known in the art are valve drives in which an adjusting screw fitted into the threaded opening of a valve rocking arm is loaded by a torsional spiral spring.

Also known are the self-adjusting valve drives in which the function of the adjusting screw fitted into the valve rocking arm is performed by a valve pusher rod with a threaded end and a nut fitted on said threaded end, the nut being loaded by a torsional spiral spring.

In the known self-adjusting valves of this type, the axial movement of the adjusting screw in the threaded opening of the rocking arm, or the movement of the nut over the threaded length of the valve pusher rod is unrestricted, so that the length of their travel may greatly exceed the distance actually necessary to ensure a soft fit of the valve on the seat, which results in the valve striking against the seat at the moment of fitting.

In order to reduce the force of impact at the moment of valve striking against the seat, in the valve drives mentioned above the thread of the rod-and-nut pair has a small pitch which greatly increases the friction between the threaded elements, resulting in failures of the valve mechanism operation.

An object of this invention is to provide such a self-adjusting valve drive which will ensure a free fit of the valve on its seat.

Another object of this invention is to ensure reliable and faultless functioning of the self-adjusting valve drive.

In accordance with the above-mentioned and other objects of this invention, a self-adjusting valve drive for internal combustion engines has been provided in which, according to this invention, the adjusting screw fitted into the threaded opening of the valve rocking arm is loaded by a torsional spiral spring.

According to this invention, the adjusting screw has a nonthrust thread and is provided with a limiter of an angle of turn which interacts with the valve rocking arm. The term "nonthrust thread" refers to a thread whose lead angle is greater than the angle of friction.

The turn angle limiter is preferably made in the form of a U-shaped member embracing the valve rocking arm and having a spherical surface upon which the end of the adjusting screw would bear.

The specific features and advantages of this invention will appear more completely from the following description of an exemplary embodiment thereof with reference to the accompanying drawings in which.

Figure 1:
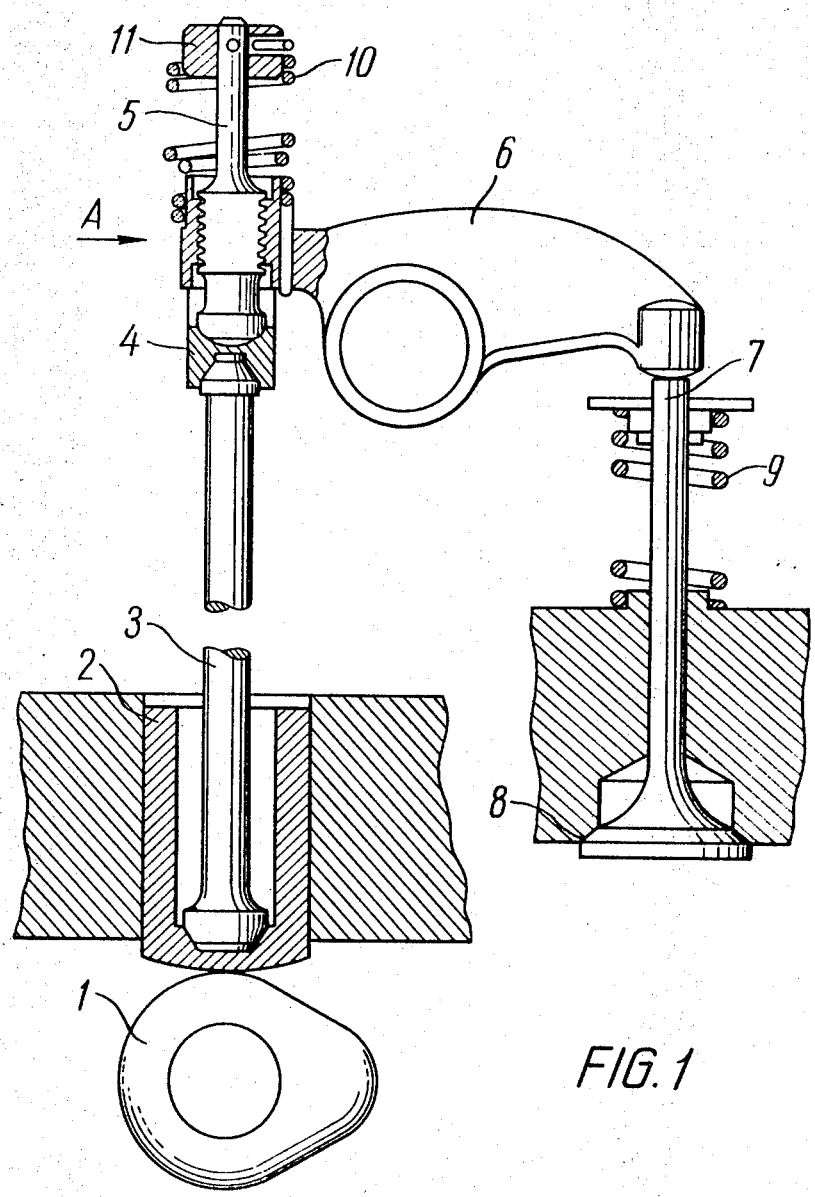
FIG. 1 is a cross-sectional view of a self-adjusting valve drive for internal combustion engines, according to this invention.

A cam 1 (FIG. 1) of the camshaft contacts the end of a pusher 2, while the lower end of a rod 3 of the pusher 2 bears against the inner spherical surface of said pusher. The upper end of the rod 3 of the pusher 2 is provided with a limiter 4 of an angle of turn of an adjusting screw 5.

The adjusting screw 5 has a multiple nonthrust thread.

Said adjusting screw is fitted into a threaded opening in the end of a rocking arm 6. The opposite end of the rocking arm 6 bears against the end face of the stem of a valve 7 which is urged against a seat 8 by means of a valve spring 9.

The adjusting screw 5 is loaded by a torsional spiral spring 10. The lower end of the spring 10 is fastened to the rocking arm 6 while the upper end is secured through a reducing bushing 11 to the adjusting screw 5.

Figure 3:
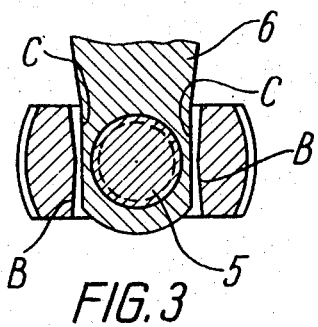
FIG. 3 is section taken on line III–III in FIG. 2.
Figure 2:
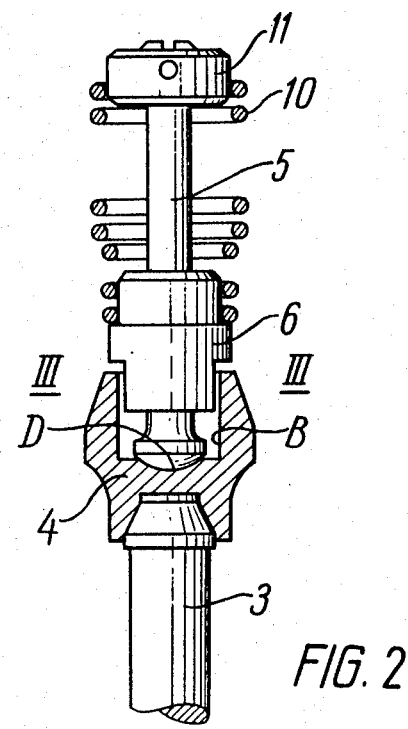
FIG. 2 is a view in the direction of arrow A in FIG. 1.

The limiter 4 of the angle of turn of the adjusting screw 5 is fashioned as a U-shaped member, its inner side surfaces B (FIG. 2) spanning the rocking arm 6, a certain clearance being provided between said U-shaped member and said rocking arm. For this purpose, two parallel surfaces C (FIG. 3) of the rocking arm 6 have been machined. The U-shaped limiter 4 of the angle of turn has a spherical surface D (FIG. 2) against which bears the end face of the adjusting screw 5.

When the adjusting screw is fitted in the rocking arm on the side of the valve, the limiter of the angle of turn of the adjusting valve is located between the end faces of the adjusting screw and the valve stem.

The self-adjusting drive of the valves of internal combustion engines operates as follows.

Upon rotation of the camshaft 1 (FIG. 1) the cam acts on the pusher 2 thus forcing said pusher to move upwards. Progressive motion is imparted through the limiter 4 on the rod 3, adjusting screw 5 and rocking arm 6 to the valve 7. As a result, the valve spring 9 is compressed and the above-mentioned parts are loaded by the force of the spring compression. Since the adjusting screw 5 is provided with the non-thrust thread, due to the effect of spring force the adjusting screw turns, at the same time overcoming the force of the preloaded spring 10. Due to the friction force, the limiter 4 turns together with the adjusting screw 5. Having turned through a small angle (approx. 6°), which causes the adjusting screw to move upwards inside the threaded opening of the rocking arm 6 through a distance of 0.05—0.08 mm., the limiter 4 bears by its inner side surfaces B (FIG. 3) against the planes C of the rocking arm 6 and stops. Simultaneously, the adjusting screw 5 also stops, since said adjusting screw is frictionally connected with limiter 4.

After the valve 7 completes its reciprocating movement and rests against the seat 8, the spring 10 unwinds with a certain force and drives the adjusting screw 5 downwards and tightens it until it stops, i.e., until all the gaps originated as a result of screwing in the adjusting screw 5 axially upwards and those caused by temperature deformation of the parts are taken up. Concurrently the limiter 4 comes back to its initial position.

In the course of subsequent reciprocating strokes of the valve, the cycle described above will be repeated again in the same sequence of operation, thus ensuring gap-free mating of all the parts of the self-adjusting drive.

I claim:

1. A self-adjusting valve drive for internal combustion engines, said drive comprising, for each individual valve, an adjusting screw with a thread whose lead angle is greater than the angle of friction; a rocking arm for actuating the valve, said rocking arm having a threaded opening, said adjusting screw being threaded into said opening to turn therein during displacement; a torsional spring acting on said adjusting screw, and a limiter of the angle of turn of said adjusting screw, said limiter being U-shaped and spanning said rocking arm with a predetermined amount of space between the rocking arm and the U-shaped limiter to allow turning of the adjusting screw which is limited only in the valve opening operation, said limiter having a spherical surface on which rests an end face of the adjusting screw.

2. A drive as claimed in claim 1 wherein the engine has a cam, and a pusher with a rod acted on by said cam, said limiter being mounted on said rod on the upper end thereof.